(12) United States Patent
Ikeuchi et al.

(10) Patent No.: US 7,501,796 B2
(45) Date of Patent: Mar. 10, 2009

(54) SEMICONDUCTOR DEVICE HAVING POSITIVE SIDE OF POWER SUPPLY VOLTAGE SET

(75) Inventors: Akira Ikeuchi, Atsugi (JP); Kazuhiro Ooshita, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 459 days.

(21) Appl. No.: 11/318,872

(22) Filed: Dec. 27, 2005

(65) Prior Publication Data

US 2006/0214705 A1    Sep. 28, 2006

(30) Foreign Application Priority Data

Mar. 23, 2005    (JP)    ............... 2005-084104

(51) Int. Cl.
*H01M 10/46*    (2006.01)

(52) U.S. Cl. .................................... 320/136

(58) Field of Classification Search ................. 320/107, 320/132, 134, 136
See application file for complete search history.

(56) References Cited

U.S. PATENT DOCUMENTS 5,717,578 A * 2/1998 Afzal .......................... 320/111
6,762,588 B2 * 7/2004 Miyazaki et al. ............ 320/116

* cited by examiner

*Primary Examiner*—Edward Tso
(74) *Attorney, Agent, or Firm*—Ladas & Parry LLP

(57) ABSTRACT

A semiconductor device having a positive side of a power supply voltage set as a common potential is disclosed. The semiconductor device includes a power supply circuit that generates a power supply having a negative potential side set to a predetermined voltage based on the common potential. In the semiconductor device, a constant voltage is generated between the common potential and an output voltage of the power supply circuit.

3 Claims, 4 Drawing Sheets

SEMICONDUCTOR DEVICE HAVING POSITIVE SIDE OF POWER SUPPLY VOLTAGE SET

BACKGROUND OF THE INVENTION

1. Field of the Invention

The present invention relates to a semiconductor device having a positive side of a power supply voltage set as a common potential.

2. Description of the Related Art

Generally, in fabricating an IC chip including a CMOS circuit, a P type semiconductor substrate is used. In the case of using a P type semiconductor substrate, the substrate potential is set to ground potential, and various types of circuits may be realized with the substrate potential being set as the common potential.

FIG. 1 is a diagram illustrating operations of a semiconductor device according to one example.

As is shown in this drawing, in a semiconductor device using a P type semiconductor device substrate, the ground potential GND becomes the reference voltage, and constant voltages such as VDD1, VDD2, Vout1, and Vout2 may be generated based on the ground voltage GND.

In a semiconductor device using an N type semiconductor substrate, the positive side potential +VDD of the power supply voltage becomes the reference potential.

Since the positive side potential +VDD of the power supply voltage is used as the reference voltage in a semiconductor device using an N type semiconductor substrate, when power is generated internally, the voltage of the power is regulated based on the positive side potential of the power supply voltage, and thereby the generated voltage may not be easily used externally.

SUMMARY OF THE INVENTION

The present invention has been conceived in response to one or more of the problems described above, and it provides a semiconductor device that is capable of obtaining a stable power supply voltage.

According to an aspect of the present invention, a semiconductor device having a positive side of a power supply voltage set as a common potential is provided that includes:

a power supply circuit that generates a power supply having a negative potential side set to a predetermined voltage based on the common potential;

wherein a constant voltage is generated between the common potential and an output voltage of the power supply circuit.

In a preferred embodiment of the present invention, the power supply circuit includes a dividing resistor arranged between the common potential and an output terminal from which the output voltage of the power supply circuit is output;

a differential amplifier that outputs a signal according to a difference between a voltage divided by the dividing resistor and a reference voltage that are supplied to the differential amplifier; and a control transistor that is connected between the dividing resistor, the output terminal, and a negative side potential of the power supply voltage, and is configured to draw a current from the output terminal according to the signal output by the differential amplifier.

In another preferred embodiment, the semiconductor device of the present invention includes an N type semiconductor substrate.

In another preferred embodiment, the semiconductor device of the present invention includes a battery protecting circuit that is connected to a battery and is configured to detect an abnormality of the battery through detecting a voltage of the battery.

According to an aspect of the present invention, by including a power supply circuit that generates a power supply having a negative potential side set to a predetermined voltage based on a common potential, and using voltage generated between the common potential and an output voltage of the power supply circuit, a stable voltage may be obtained between the common potential and the output voltage, and by connecting a load between the common potential and the output voltage, a stable voltage may be supplied to the load.

DETAILED DESCRIPTION OF THE PREFERRED EMBODIMENTS

In the following, principles and embodiments of the present invention are described with reference to the accompanying drawings.

[System Configuration]

Figure 1:
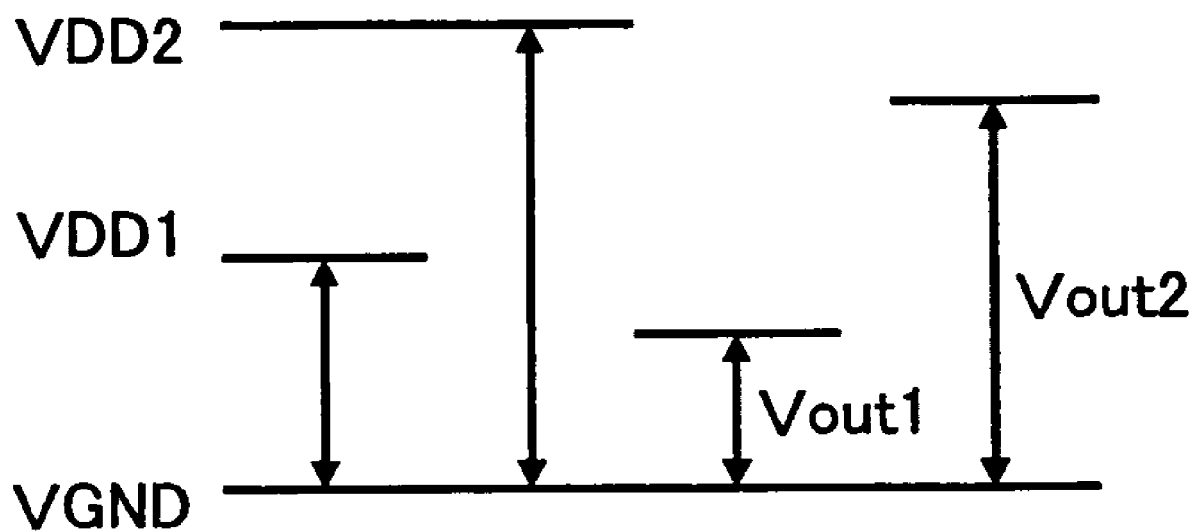
FIG. 1 is a diagram illustrating operations of a semiconductor device according to one example.
Figure 2:
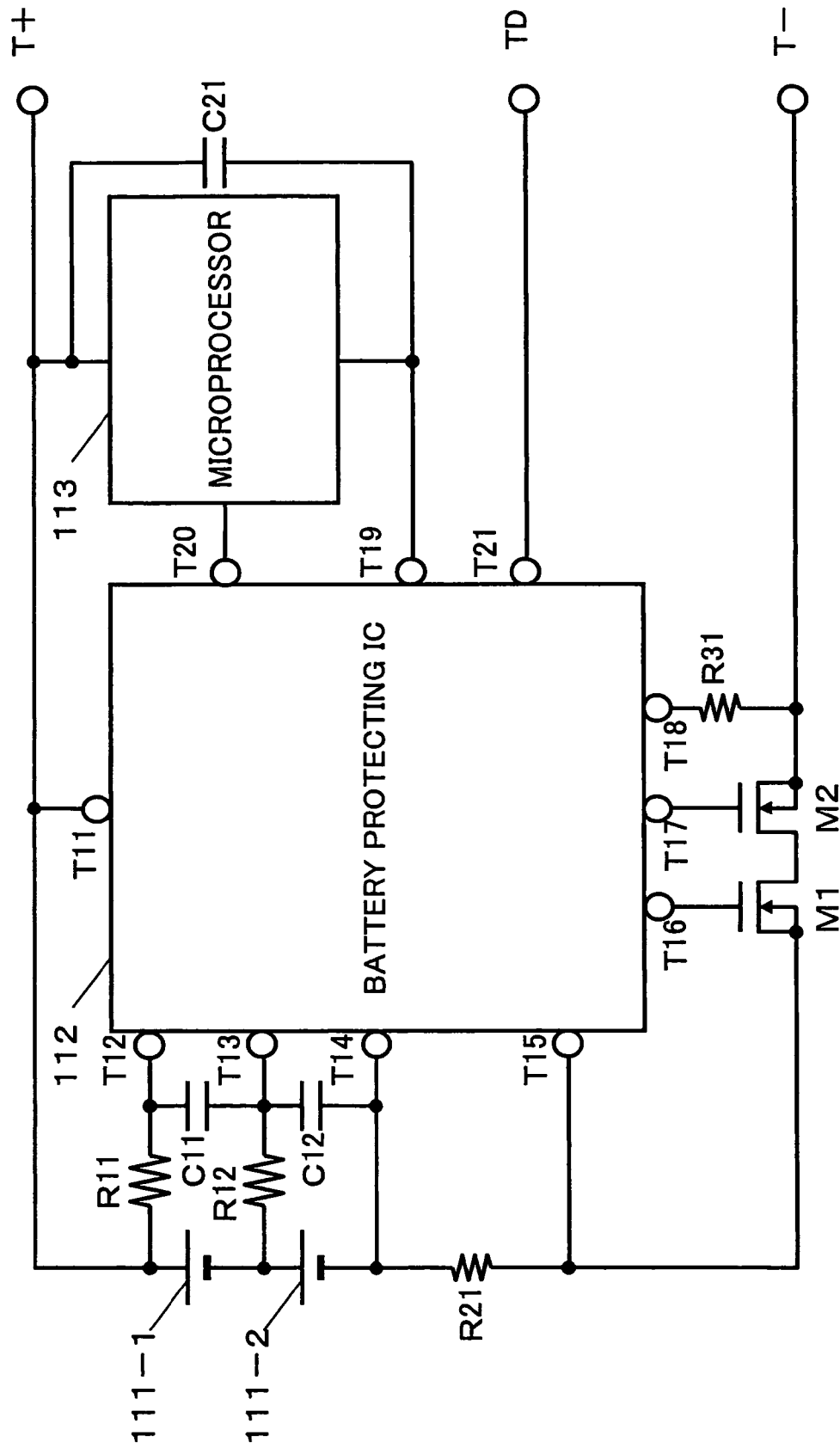
FIG. 2 is a circuit diagram illustrating a configuration of a power supply system according to an embodiment of the present invention.

FIG. 2 is a circuit diagram illustrating a configuration of a power supply system according to an embodiment of the present invention.

The power supply system 100 according to the present embodiment includes batteries 111-1 and 111-2, a battery protecting IC 112, a microprocessor 113, control transistors M1 and M2, resistors R11, R12, R21, and R31, and capacitors C11, C12, and C21, for example.

According to the present embodiment, the batteries 111-1 and 111-2 may be lithium ion batteries, for example, that have positive electrodes connected in series to a terminal T+, and negative electrodes connected in series to a terminal T− via the resistor R21 and the control transistors M1 and M2.

The battery protecting IC 112 is a one chip semiconductor device that is configured to detect a voltage of the batteries 111-1 and 111-2 to detect an abnormal state of the batteries 111-1 and 111-2, and turn off the control transistors M1 and M2 to protect the batteries 111-1 and 111-2 upon detecting such an abnormal state. Also, in the present embodiment, the battery protecting IC 112 is configured to detect the input/output of current to/from the batteries 111-1 and 111-2 to determine the remaining power (stored energy) within the batteries 111-1 and 111-2, for example.

The microprocessor 113 is connected to a terminal T20 of the battery protecting IC 112, and is configured to determine the remaining power within the batteries 111-1 and 111-2 based on digital data supplied thereto from the terminal T20 of the battery protecting IC 112. Data pertaining to the remaining power within the batteries 111-1 and 111-2 determined by the microprocessor 113 are supplied to the battery protecting IC 112 via the terminal T20, at which the supplied data are level-shifted to then be output from a terminal T21 of the battery protecting IC 112. In one embodiment, the terminal T21 may be connected to a CPU of the present system to supply data such as data pertaining to the remaining power within the batteries 111-1 and 111-2 to the CPU, for example. In one embodiment, the CPU of the system may be configured to process data such as data pertaining to the remaining power within the batteries 111-1 and 111-2 supplied from the battery protecting IC 112 to display the supplied remaining power data on a display apparatus, for example.

According to the present embodiment, the drain-source of the control transistor M1 are connected between the resistor R21 and the control transistor M2, and the gate of the control transistor M1 is connected to a terminal T16 of the battery protecting IC 112. Also, in the present embodiment, the drain-source of the control transistor M2 are connected between the control transistor M1 and the terminal T−, and the gate of the control transistor M2 is connected to a terminal T17 of the battery protecting IC 112. The control transistors M1 and M2 are turned off when abnormality of the batteries 111-1 and 111-2 is detected by the battery protecting IC 112 so that the connection between the batteries 111-1, 111-2, and the terminal T− may be cut off.

According to the present embodiment, the resistor R11 is connected between the positive terminal of the battery 111-1 and the terminal T12 of the battery protecting IC 112. The resistor R12 is connected between the positive terminal of the battery 111-2 and the terminal T13 of the battery protecting IC 112. The capacitor C11 is connected between the terminal T12 and the terminal T13 of the battery protecting IC 112. The capacitor C12 is connected between the terminal T13 and the terminal T14 of the battery protecting IC 112. The resistor R11 and the capacitor C11 realize and stabilize the voltage applied between the terminal T13 and the terminal T14.

The resistor R21 is connected between the battery 111-2 and the control transistor M1, and has one end connected to the terminal T14 and the other end connected to the terminal T15.

The resistor R31 has one end connected to a terminal T18 and the other end connected to the terminal T− of the battery protecting IC 112, and is used to detect a shorted state of the batteries 111-1 and 111-2.

[Battery Protecting IC 112]

Figure 3:
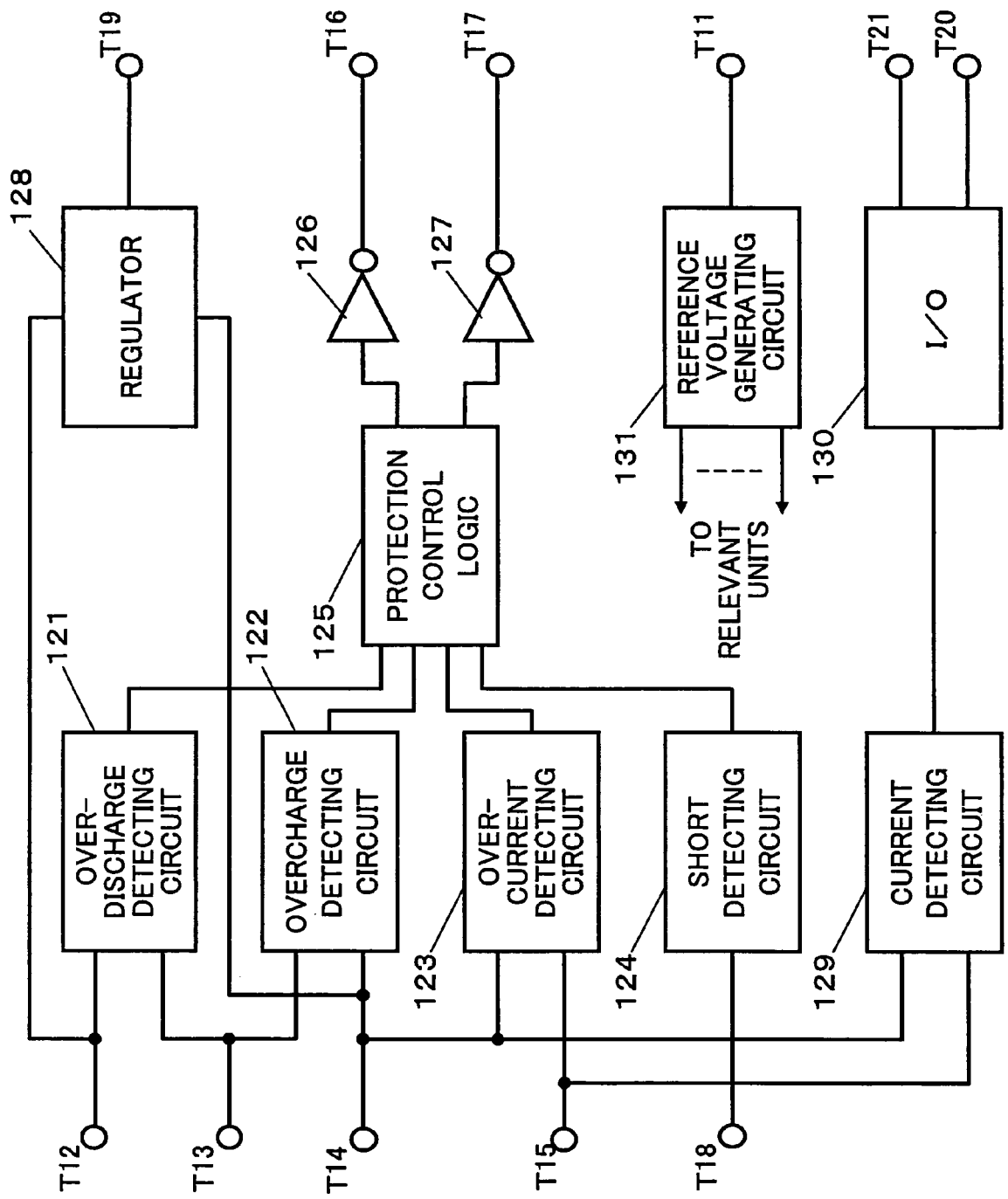
FIG. 3 is a circuit diagram illustrating a configuration of a battery protecting IC according to an embodiment of the present invention.

FIG. 3 is a circuit diagram illustrating a configuration of the battery protecting IC 112 according to an embodiment of the present invention.

According to the illustrated embodiment, the battery protecting IC 112 is a one chip semiconductor device that includes an over-discharge detecting circuit 121, an overcharge detecting circuit 122, an over-current detecting circuit 123, a short detecting circuit 124, a protection control logic 125, drive circuits 126 and 127, a regulator 128, a current detecting circuit 129, an input/output circuit 130, and a reference voltage generating circuit 131.

The over-discharge detecting circuit 121 is connected to the terminals T12 and T13, and is configured to detect an over-discharged state of the batteries 111-1 and 111-2 and output a high level output upon detecting such an over-discharged state.

The overcharge detecting circuit 122 is connected to the terminals T13 and T14, and is configured to detect an over-charged state of the batteries 111-1 and 111-2 and output a high level output upon detecting such an overcharged state.

The over-current detecting circuit 123 is connected to the terminals T14 and T15, and is configured to detect an over-current state of the current flowing within the batteries 111-1 and 111-2 and output a high level output upon detecting such an over-current state.

The short detecting circuit 124 is connected to the terminal T18, and is configured to detect a shorted state of the batteries 111-1 and 111-2 and output a high level output upon detecting such a shorted state.

According to the present embodiment, the outputs of the over-discharge detecting circuit 121, the overcharge detecting circuit 122, the over-current detecting circuit 123, and the short detecting circuit 124 are supplied to the protection control logic 125. The protection control logic 125 is configured to detect an abnormal state based on the outputs of the over-discharge detecting circuit 121, the overcharge detecting circuit 122, the over-current detecting circuit 123, and the short detecting circuit 124, and output a low level output upon detecting such an abnormal state. In the present embodiment, a first output of the protection control logic 125 is supplied to the terminal T16 via the drive circuit 126, and a second output of the protection control logic 125 is supplied to the terminal T17 via the drive circuit 127.

The drive circuits 126 and 127 are inverters that are configured to invert the first and second outputs of the protection control logic 125 and supply the inverted outputs to the terminals T16 and T17, respectively.

The regulator 128 is connected between the terminal T12 and the terminal T14, and is configured to generate a regulated voltage from a voltage applied between the terminal T12 and the terminal T14 and output the generated voltage from the terminal T19. In this case, the regulator 128 generates the regulated voltage based on the positive side potential of the power supply voltage.

The current detecting circuit 129 is connected between the terminal T14 and the terminal T15, and is configured to detect the current flowing within the batteries 111-1 and 111-2. The current detected at the current detecting circuit 129 is supplied to the input/output circuit 130.

The input/output circuit 130 is configured to create digital data according to the current detected at the current detecting circuit 129, and supply the digital data to the microprocessor 113 through the terminal T20.

The reference voltage generating circuit 131 is connected to the terminal T11, and is configured to generate reference voltages to be supplied to the relevant units of the battery protecting IC 112 from a voltage applied to the terminal T11.

[Regulator 128]

In the following, the regulator is described in greater detail.

Figure 4:
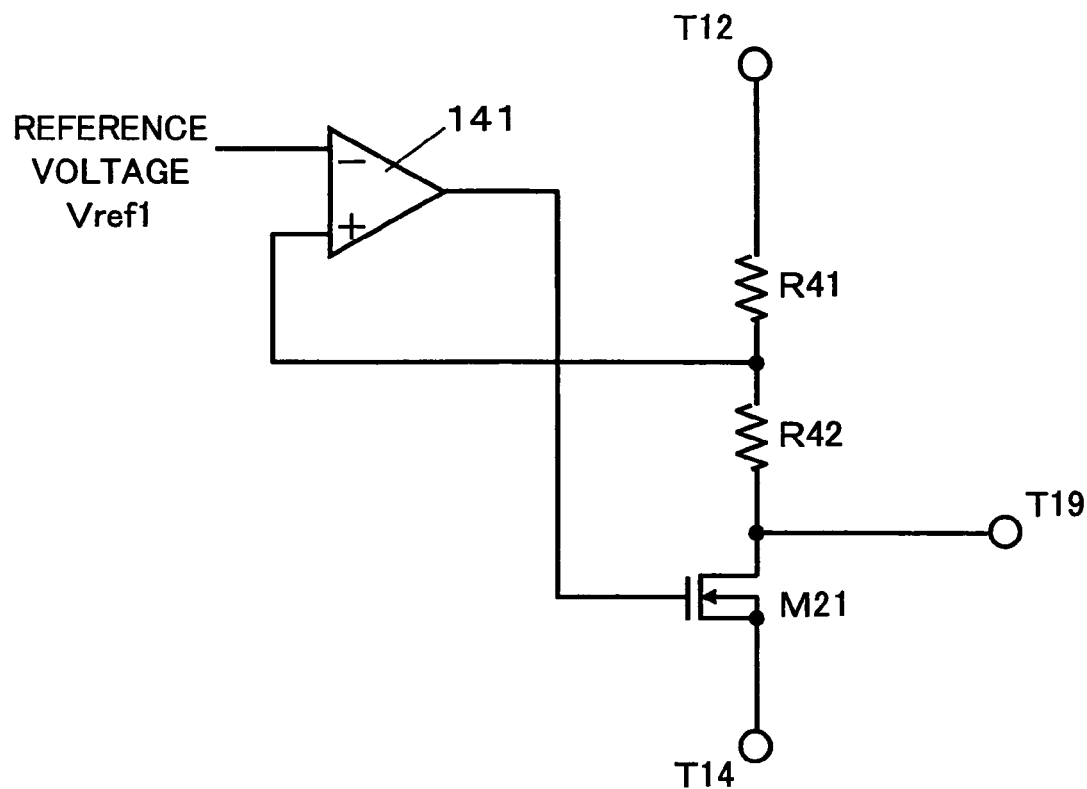
FIG. 4 is a circuit diagram illustrating a configuration of a regulator according to an embodiment of the present invention.

FIG. 4 is a circuit diagram showing a configuration of the regulator 128 according to an embodiment of the present invention.

According to the illustrated embodiment, the regulator 128 includes an error amplifier 141, resistors R41 and R42, and a transistor M21.

A reference voltage Vref1 is applied to an inverting input terminal of the error amplifier 141 from the reference voltage generating circuit 131. A non-inverting terminal of the error amplifier 141 is connected to a connection point between the resistor R41 and the resistor R42. The resistors R41, R42, and the drain-source of the transistor M21 are serially connected between the terminal T12 and the terminal T14.

The connection point between the resistor R42 and the transistor M21 is connected to the terminal T19. The error amplifier 141 outputs a difference between the reference voltage Vref1 and the voltage at the connection point between the resistor R41 and the resistor R42, and supplies the output to the gate of the transistor M21. The transistor M21 is controlled by the error amplifier 141 such that the voltage of the connection point between the resistor R41 and the resistor R42 may be set to the reference voltage Vref1.

As can be appreciated from the above descriptions, in the present embodiment, the regulator 128 controls the current to be drawn from the terminal T19 so that the voltage applied between the terminal T12 and the terminal T19 may be constant. In this way, the voltage between the terminal T12 and the terminal T19 may be maintained constant. In such a case, a voltage based on the positive side of the power supply voltage is output from the terminal T19.

[Operations]

Figure 5:
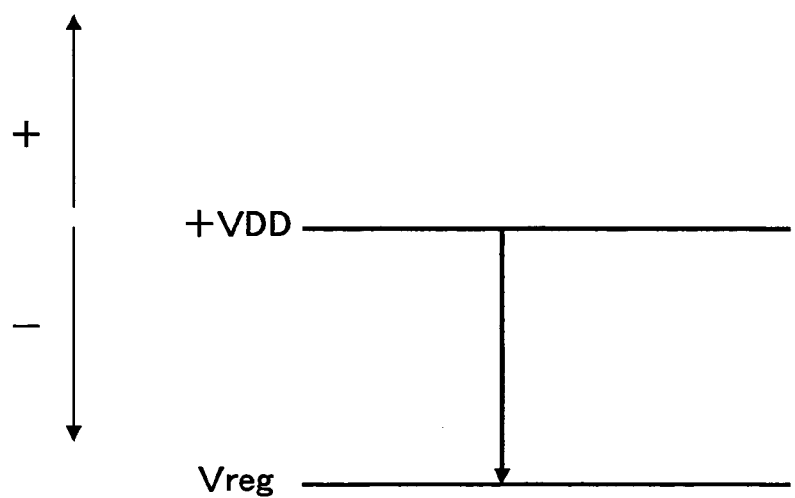
FIG. 5 is a diagram illustrating operations of a semiconductor device according to an embodiment of the present invention.

FIG. 5 is a diagram illustrating operations of the battery protecting IC 112 according to an embodiment of the present invention.

According to the illustrated embodiment, a negative side potential of the power supply voltage is controlled based on the positive side potential +VDD of the power supply voltage, and a regulated voltage Vreg that is maintained at a constant voltage is output from the terminal T19.

In one embodiment, the microprocessor 113 may operate by acquiring drive power that is generated between the positive side potential +VDD of the power supply voltage and the terminal T19.

According to an aspect of the present embodiment, a potential is controlled based on the positive side potential +VDD of the power supply voltage to generate a constant voltage so that the battery protecting IC 112 including a power supply circuit such as the regulator 128 may be fabricated using an N type semiconductor substrate.

Further, it is noted that the present invention is not limited to the specific embodiments described above, and variations and modifications may be made without departing from the scope of the present invention.

The present application is based on and claims the benefit of the earlier filing date of Japanese Patent Application No. 2005-084104 filed on Mar. 23, 2005, the entire contents of which are hereby incorporated by reference.

What is claimed is:

1. A semiconductor device having a positive side of a power supply voltage set as a common potential, the semiconductor device comprising:
   a power supply circuit that generates a power supply having a negative potential side set to a predetermined voltage based on the common potential, wherein a constant voltage is generated between the common potential and an output voltage of the power supply circuit;
   a battery protecting circuit connected to the power supply circuit; and
   a battery connected to the battery protecting circuit, wherein the battery protecting circuit detects an abnormality of the battery through detecting a voltage of the battery.

2. The semiconductor device as claimed in claim 1, wherein the power supply circuit includes
   a dividing resistor arranged between the common potential and an output terminal from which the output voltage of the power supply circuit is output;
   a differential amplifier that inputs a divided voltage divided by the dividing resistor and a reference voltage and outputs a signal according to a difference between the divided voltage and the reference voltage; and
   a control transistor that is connected between the dividing resistor, the output terminal, and a negative side potential of the power supply voltage, and is configured to draw a current from the output terminal according to the signal output by the differential amplifier.

3. The semiconductor device as claimed in claim 1, further comprising:
   an N type semiconductor substrate.

* * * * *